Figure 1:
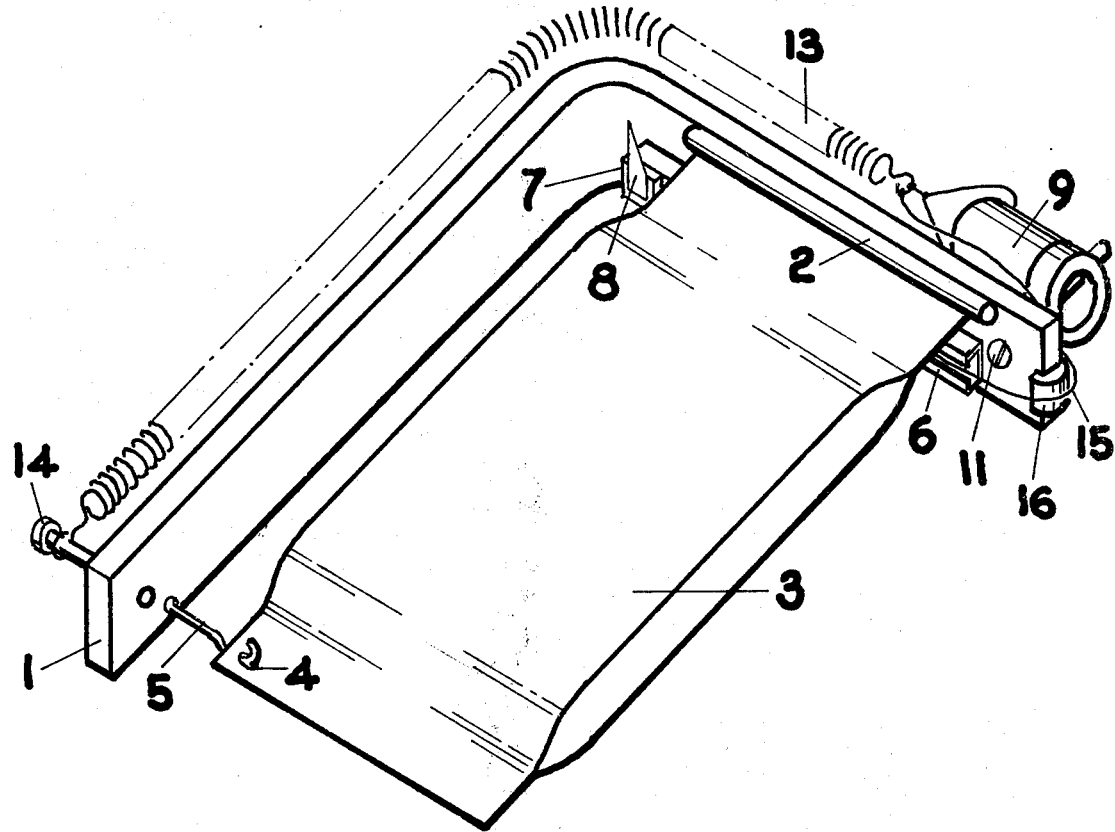

United States Patent [19]

Kingston

[11] 4,143,479
[45] Mar. 13, 1979

[54] FISH BAIT DISPENSER

[76] Inventor: William Kingston, 47 Mespil Rd., Dublin, Ireland

[21] Appl. No.: 687,277

[22] Filed: May 17, 1976

Related U.S. Application Data

[63] Continuation of Ser. No. 450,262, Mar. 11, 1974, abandoned.

[51] Int. Cl.² .......................................... A01K 97/02
[52] U.S. Cl. .................................. 43/44.99; 414/412
[58] Field of Search .............. 43/44.99; 222/83.5; 214/305

[56] References Cited

U.S. PATENT DOCUMENTS

| | | | |
|---|---|---|---|
| 2,031,869 | 2/1936 | Trouth | 214/305 |
| 3,319,595 | 5/1967 | Van Dorn et al. | 9/8 R X |
| 3,426,472 | 2/1969 | Richard | 43/100 |

FOREIGN PATENT DOCUMENTS

| | | | |
|---|---|---|---|
| 1275039 | 9/1961 | France | 43/44.99 |
| 1488709 | 6/1967 | France | 43/44.99 |

*Primary Examiner*—Louis G. Mancene
*Assistant Examiner*—Daniel J. Leach

[57] ABSTRACT

A vacuum package containing a single dose of the material to be dispensed is held in a frame so that it can be cut open by a spring-loaded sliding blade. The blade is held off the package against the force of the spring by a timer, which is an arrangement of a metal shear pin in contact with another metal of lower electrode potential. Immersion of the timer in an electrolyte such as sea water initiates galvanic action which causes the shear pin to corrode to failure close to a predetermined time.

5 Claims, 2 Drawing Figures

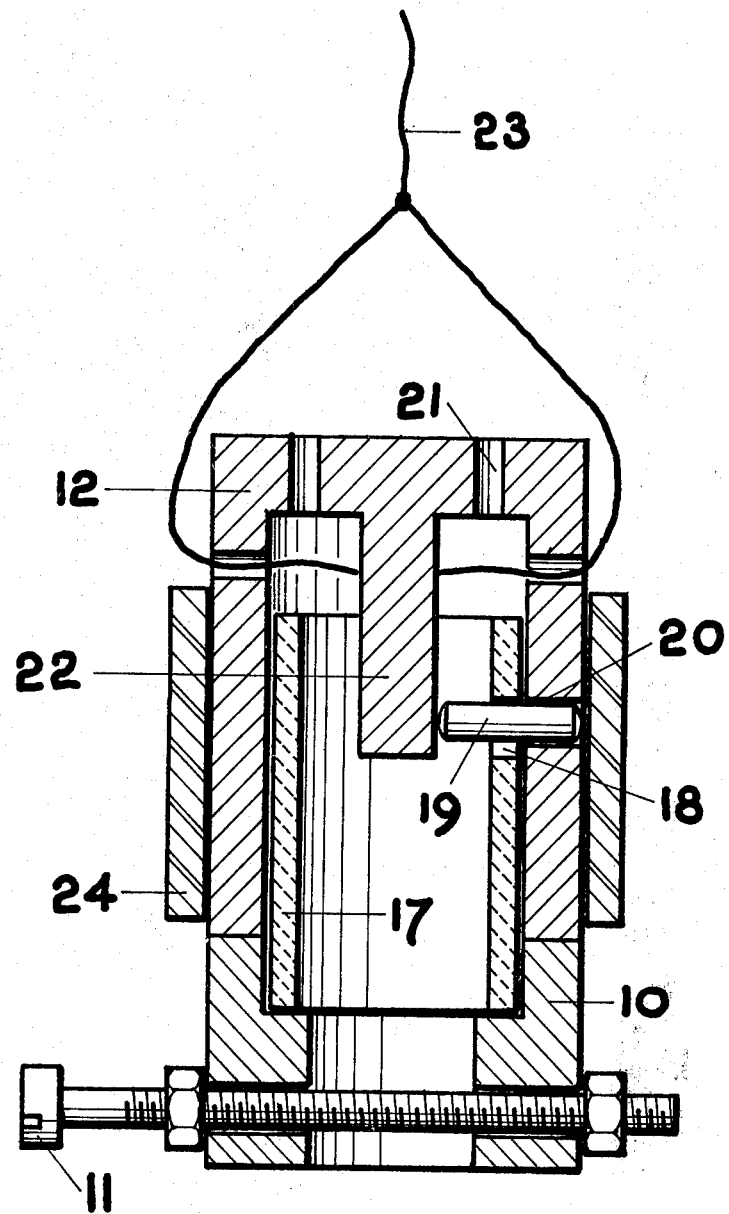
Fig-2-

FISH BAIT DISPENSER

CROSS REFERENCE OF RELATED APPLICATION

This application is a continuation of patent application Ser. No. 450,262, filed Mar. 11, 1974, for Fish Bait Dispenser, now abandoned, which in turn is for reissue of U.S. Pat. No. 3,654,725 issued Apr. 11, 1972.

A vacuum package containing a single dose of the material to be dispensed is held in a frame so that it can be cut open by a spring-loaded sliding blade. The blade is held off the package against the force of the spring by a timer, which is an arrangement of a metal shear pin in contact with another metal of lower electrode potential. Immersion of the timer in an electrolyte such as sea water initiates galvanic action which cause the shear pin to corrode to failure close to a predetermined time.

Crabs are known to prefer bait that is fresh, and traps for catching them therefore have to be lifted frequently so that the bait can be replaced. This invention provides a means of keeping reserves of bait fresh in the trap and of releasing them at predetermined times, thus lengthening the optimum time between trap hauls and improving the yield for a given fishing effort.

In the accompanying drawings,

FIG. 1 is a perspective view of the best way I know at present of making this invention, and FIG. 2 is a section of the timer control means which forms a part of it.

It will therefore be seen that the delay release mechanism of the dispenser depends upon the galvanic corrosion of an anode pin in contact with a more noble metal in sea water. The time to failure of the pin is a function of its own mass and surface area, and the surface area of the cathode; as the cathode is protected by the reaction, its mass is unimportant. Cathode 17 is fixed to supporting frame 1 by means of its holder, timer lower part 10 and bolt 11. Although a magnesium-copper couple is used in the preferred embodiment, the delay release fixed to the frame consists essentially of a measured surface area of metal in electrical contact with a measured mass and surface area of a second metal which is higher in the galvanic series in sea water than the first (as metals have different electrode potentials in different electrolytes.) It is their relative potentials (the "series") in sea water that is relevant for the present invention.

In FIG. 1, a frame 1 has a spring clip 2 to grip the whole of one end of a vacuum-packed pouch 3. One corner of pouch 3 has a hole 4 punched in it outside the seal, which hole fits over a hook 5 on frame 1. A track 6 runs along the length of spring clip 2 and a slide 7, to which is attached a blade 8, runs in track 6. The timer 9 has two parts (seen more clearly in FIG. 2), a lower part 10 which is fixed to frame 1 by bolt 11, and an upper part 12 which is attached to tension spring 13. The other end of spring 13 is anchored to frame 1 by bolt 14. Timer upper part 12 is linked by cord 15, which passes over bearing 16, to slide 7.

Referring to FIG. 2, both upper and lower parts of timer 9 are made of an insulating material. Timer lower part 10 is a holder for cathode 17, which is in the form of a piece of copper tubing in one wall of which a hole 18 has been bored. Timer upper part 12 is a holder for the anode 19 which is in the form of a magnesium alloy shear pin which is a press fit through a hole 20 in the wall of timer upper part 12 and also fits through the much larger hole 18 in the wall of cathode 17, so that its upper surface is in contact with the inside top of hole 18. Vent holes 21 allow gas evolved in the galvanic couple to escape. Timer upper part 12 is a sliding fit on cathode 17 and incorporates stop 22 so that when anode pin 19 is pushed home from outside the same length of pin will always project inwardly through the holes 18, 20.

Cord 23 is to attach timer upper part 12 to spring 13. Flexible sleeve 24 can be moved along the outside wall of timer upper part 12, to cover the outward end of anode pin 19.

In operation, separation of the two parts of timer 9 under the force of spring 13 is initially prevented by contact between cathode 17 and anode shear pin 19. In the presence of an electrolyte such as sea water, however, an electric current flows between the metals, with the result that the anode shear pin 19 corrodes inwardly from the end closest to stop 22, until eventually its cross section becomes too small to sustain the force of spring 13, when it breaks. This releases timer upper part 12 so that the force of spring 13 becomes transferred through cord 15 to slide 7, moving it and blade 8 along track 6 and cutting the end off pouch 3. The weight of the contents of pouch 3 then causes it to swing downwardly about hook 5 so that the contents fall out of the opened end.

In tests, anode 19 has been made from a commercial brand of magnesium alloy with a composition of 1 percent zinc 0.3 percent manganese, 6 percent aluminum, remainder magnesium and impurities. It has been found that the life of the anodes is made shorter and very much more uniform if their surfaces are cleaned and the oxide removed by treating them for 3 - 4 minutes at room temperature in a solution containing 20 percent by volume of 85 percent phosphoric acid and 100 grams/liter of potassium bifluoride. Moreover, if the anodes are then zinc coated by being washed in cold running water and immersed in a solution of 120 grams/liter of potassium pyrophosphate, 30 grams/liter zinc sulphate, 7 grams/liter sodium fluoride and 5 grams/liter potassium carbonate, at a temperature of 80° - 85° C. for 3 - 5 minutes, with mild agitation, they can be stored for not less than 1 week in plastic envelopes without adverse effect on the consistency of their corrosion rate. In the laboratory, three pins of this type of 0.44 inch diameter, in contact with two in 1 inch bore copper tube as cathode, corroded to failure in 162, 163 and 176 hours respectively. In the open sea, four successive tests, each with three shear pins of 0.187 inch diameter and similar sized copper cathodes, gave a mean time to failure of 30.3 hours with a standard deviation of 1.27 hours. Difference in the conductivity of sea water due to temperature must of course be taken into account when using a timer of this type.

It has been found that in a water current flow (e.g., with the timer being used in a tideway) it is necessary to shield the metals from the current to achieve consistency, and the two parts of timer 9 are accordingly arranged to do this as well as holding the components of the couple. Flexible sleeve 24 acts as a similar shield for the outward end of anode 19. Further, it is important that point of contact between the metals should never be underneath the pin. If this happens, because the corrosion pattern reflects the paths taken by the evolved hydrogen, "slip" may occur before definitive failure, thus interposing a film of galvanic chalk as an insulator between the metals and bringing the couple (and corrosion of the anode) to an end.

As galvanic chalk is deposited out of sea water on to the cathode due to the couple; it is necessary to clean this off periodically, or the flow of electric current will be stifled. This can be done conveniently by immersing the cathode in dilute hydrochloric acid, and for this reason timer lower part 10 can usefully be made of an insulating material which is also resistant to this acid, such as P.T.F.E., to save having to detach the cathode from its holder before cleaning. Timer upper part 12 may be of any suitable material which is also an insulator.

Although any pair of metals of different electrode potential can be used in this release device, since galvanic corrosion always takes place at the anode, for ease of handling the anode shear pins are most conveniently made from metals with a relatively high electrode potential, and which therefore corrode quickly, such as magnesium, aluminum or zinc. Such metals also have the advantage that special alloys of them have been developed with a view to consistent corrosion as sacrificial anodes in cathodic protection applications.

Typical percentage compositions of such anode materials are: (1) 5.8 aluminum, 3.1 zinc, 0.2 manganese, 0.05 silicon, 0.003 copper, 0.002 iron, 0.001 nickel, remainder magnesium; (2) aluminum 0.1 - 0.3, cadmium 0.025 - 0.06, iron not more than 0.0014, remainder zinc; (3) zinc 5, remainder aluminum.

In each case an appropriate method of removing or standardizing the oxide coating of the metal has to be used, as in the case of the embodiment described above.

I claim:

1. A dispenser for use in fish traps disposed under water in the sea for automatically dispensing fish bait after immersion in sea water for a predetermined period of time, said dispenser comprising:

an hermetically sealed rupturable container for said bait;

a frame secured peripherally to said container;

a timer supported on said frame and incorporating a galvanic couple, said couple being constituted by first and second metals having different positions in the galvanic series in sea water, the second metal being positioned below said first metal, the first metal being dissolved in sea water by galvanic action, the time required for dissolution (which is equal to said period) being determined by the original quantity and and surface area of the first metal and the surface area of said second metal;

means which, when rupturing energy is supplied thereto, ruptures said container, said means being supported on said frame; and a source of rupturing energy supported on said frame and coupled both to said timer and said means, the energy in said source being released therefrom and supplied to said means to cause same to rupture the container when said first metal is dissolved.

2. The dispenser of claim 1 wherein said source is a spring.

3. The dispenser of claim 2 wherein said means includes a knife.

4. The dispenser of claim 3 wherein said means includes a track and a slide slidable in said track, said knife being secured to said slide and slidable therewith in said track.

5. The dispenser of claim 4 wherein said spring is normally in tension and contracts when the energy therein is released, said spring being secured to said slide by a cord, said spring when compressed pulling said slide and knife within the track to cut into said container.

* * * * *